United States Patent

Mercer

[15] 3,656,406
[45] Apr. 18, 1972

[54] CONTROL APPARATUS FOR DOUBLE-ACTING HYDRAULIC CYLINDER AND PISTON ASSEMBLY

[72] Inventor: James R. Mercer, Akron, Ohio
[73] Assignee: McDowell-Wellman Engineering Company, Cleveland, Ohio
[22] Filed: Feb. 1, 1971
[21] Appl. No.: 111,328

[52] U.S. Cl. .................................................. 91/401
[51] Int. Cl. ................................................ F15b 15/22
[58] Field of Search ..................................... 91/401

[56] References Cited

UNITED STATES PATENTS

| 2,552,634 | 5/1951 | Kerr | 91/401 |
| 2,630,830 | 3/1953 | Meddock | 91/401 |
| 2,783,744 | 3/1957 | Tennis | 91/401 |
| 2,948,263 | 8/1960 | Roger | 91/401 |
| 3,004,524 | 10/1961 | McCoy et al. | 91/401 |

Primary Examiner—Paul E. Maslousky
Attorney—McNenny, Farrington, Pearne & Gordon

[57] ABSTRACT

A safety vent valve or poppet valve assembly for a double-acting hydraulic cylinder, having duplex, opposed coaxial valve poppets closing a valve bore through the piston, and having a means to open the valve bore when the piston has moved beyond its working limits to provide a channel to vent fluid under predetermined excessive pressure. The venting of fluid under pressure when the piston has moved beyond its normal working stroke substantially reduces the force exerted by the piston upon the restraining machine member.

7 Claims, 3 Drawing Figures

INVENTOR
JAMES R. MERCER

BY

ATTORNEYS

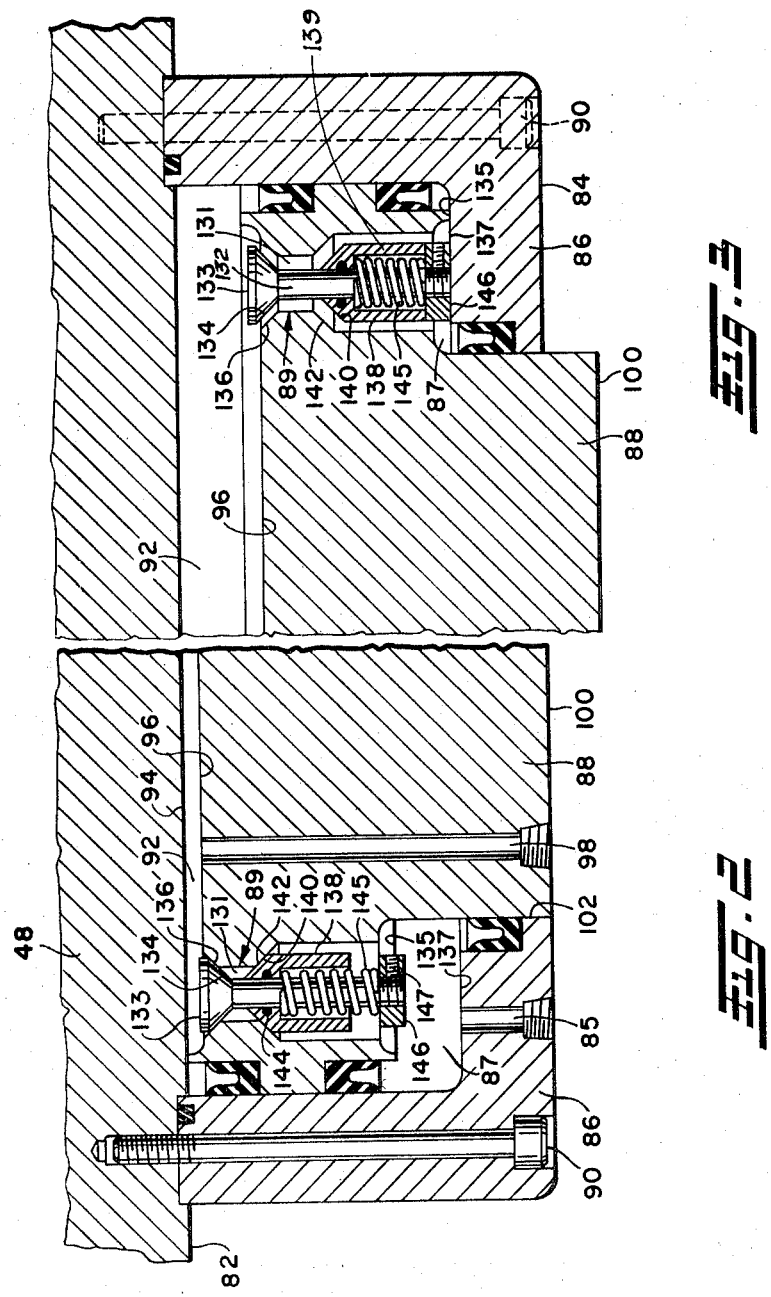

CONTROL APPARATUS FOR DOUBLE-ACTING HYDRAULIC CYLINDER AND PISTON ASSEMBLY

BACKGROUND OF THE INVENTION AND PRIOR ART

This invention relates generally to a hydraulic piston-cylinder assembly useful, for example, in mold-closing apparatus for an injection molding machine.

A hydraulic piston-cylinder assembly consists of a cylinder member and a reciprocable piston member. In a mold-closing and clamping apparatus, such an assembly may be located between two end plates and supported by tie bars connecting the two end plates and arranged to move therealong.

An example of a prior art device of the type to which the present invention is particularly relevant and which provides a suitable environment for the present invention is shown in U.S. Pat. No. 2,718,662. Also there is shown in U.S. Pat. Nos. 3,156,014 and 3,194,868 another structure to which the teachings of the present invention may be applied with advantage. The teachings of these patents are incorporated herein by reference thereto.

With respect to U.S. Pat. No. 3,156,014, the patentee shows a movable assembly in which the force to expel hydraulic fluid from the cylinder is derived through a mechanical linkage from the power source used to move the assembly along the tie rods. There is no provision in the assembly to mechanically restrain movement of the piston out of the cylinder beyond its normal stroke. Inadvertent introduction of hydraulic fluid into the cylinder chamber, when any other member of the machine is out of proper position to restrain the piston travel, for example, the thrust plate 72 (FIG. 5), or the locking members 29 (FIGS. 1 – 3) of U.S. Pat. No. 3,156,014, will cause the piston to continue to move out of the cylinder. Considerable damage to related mechanical structures may result, necessitating the shut-down of the molding machine for extensive repairs.

With respect to the device illustrated in U.S. Pat. No. 3,194,868, the cylinder-piston assembly has been altered to provide a plurality of compression springs to supply the force needed to expel the hydraulic fluid from the cylinder. There is also provided a plurality of safety screws to restrain movement of the piston out of the cylinder beyond its normal working stroke in the event of inadvertent introduction of hydraulic fluid into the cylinder chamber while there is no external means to restrain the movement of the piston out of the cylinder. The power means to move the piston-cylinder assembly is connected to its adjacent member. The force to move the second member is transmitted through the plurality of compression springs. These springs will compress, permitting the piston to be drawn from the cylinder chamber to the limit of the safety screws, should the force needed to separate and open the parts of the mold exceed the precompression of the springs. Once the mold has been opened, the springs will pull the cylinder member over the piston portion of the piston member with sufficient force to cause a severe shock when the two members close one upon the other.

SUMMARY OF THE INVENTION

The present invention is utilized most effectively in an improved mold-clamping piston-cylinder assembly located between two end plates as in the devices mentioned and with one or both members of the assembly supported by the strain or tie rods connecting the two end plates for movement therealong. The piston member and cylinder member of the assembly have been altered to form a double-acting device which provides two opposed chambers, one on either end of the piston. The piston extension passing out through an apertured end of the cylinder member can be made to extend or retract by alternately introducing hydraulic fluid to one cylinder chamber while hydraulic fluid is vented from the cylinder chamber at the opposite end of the piston, such as by the use of a conventional hydraulic fluid four-way directional control valve.

According to this invention, there is provided one or more valve bores through the piston connecting the two cylinder chambers, one at either end of the piston. Each such bore is normally closed by two opposed coaxial valve poppets. The first and second valve poppets are arranged to open as the piston extension moves out of the cylinder member beyond its predetermined normal working stroke. Thus, the high pressure chamber, into which hydraulic fluid is being introduced through the four-way valve, is vented through a channel formed by the valve bores or passages and the open poppets and communicating with a low pressure chamber adjacent the opposite face of the piston which is in turn vented through the same four-way direction valve. One poppet valve is opened mechanically and the other in response to fluid pressure of sufficient magnitude to overcome biasing means, e.g. a spring. The hydraulic fluid pressure in the high pressure chamber is thus greatly reduced, thereby reducing the piston force proportionately at the time the piston is restrained from further extension by the axial limit of the vented low pressure chamber. Thus the cylinder structure may be of substantially smaller proportions, comprising less material and requiring less space than would be the case if the valve bore or bores and valve poppets were omitted from the piston.

Therefore, compared to prior art devices, the injection molding machine of the present invention is not subject to mechanical damage if hydraulic fluid is introduced into a cylinder chamber inadvertently or otherwise while some member of the machine which normally restrains the piston-cylinder assembly is out of place. Motion of the piston member relative to the cylinder member of the piston-cylinder assembly is under control of a single hydraulic fluid four-way directional control valve, eliminating the mechanical linkages, springs and safety tie screws used in the prior art devices. The cylinder member structure can be of smaller proportions resulting in a reduction in weight and space requirements.

BRIEF DESCRIPTION OF THE DRAWINGS

In the annexed drawings:

FIG. 2 is a fragmentary cross-sectional view on an enlarged scale showing some details of a double-acting hydraulic fluid cylinder carried by the intermediate plate shown in FIG. 1 and showing the poppet valve assembly in its normally closed position.

FIG. 3 is a fragmentary cross-sectional view of details similar to those shown in FIG. 2 with the piston displaced to its limit and the poppet valve assembly open to by-pass fluid from the high pressure chamber to the low pressure chamber.

DETAILED DESCRIPTION OF THE DRAWINGS

Figure 1:
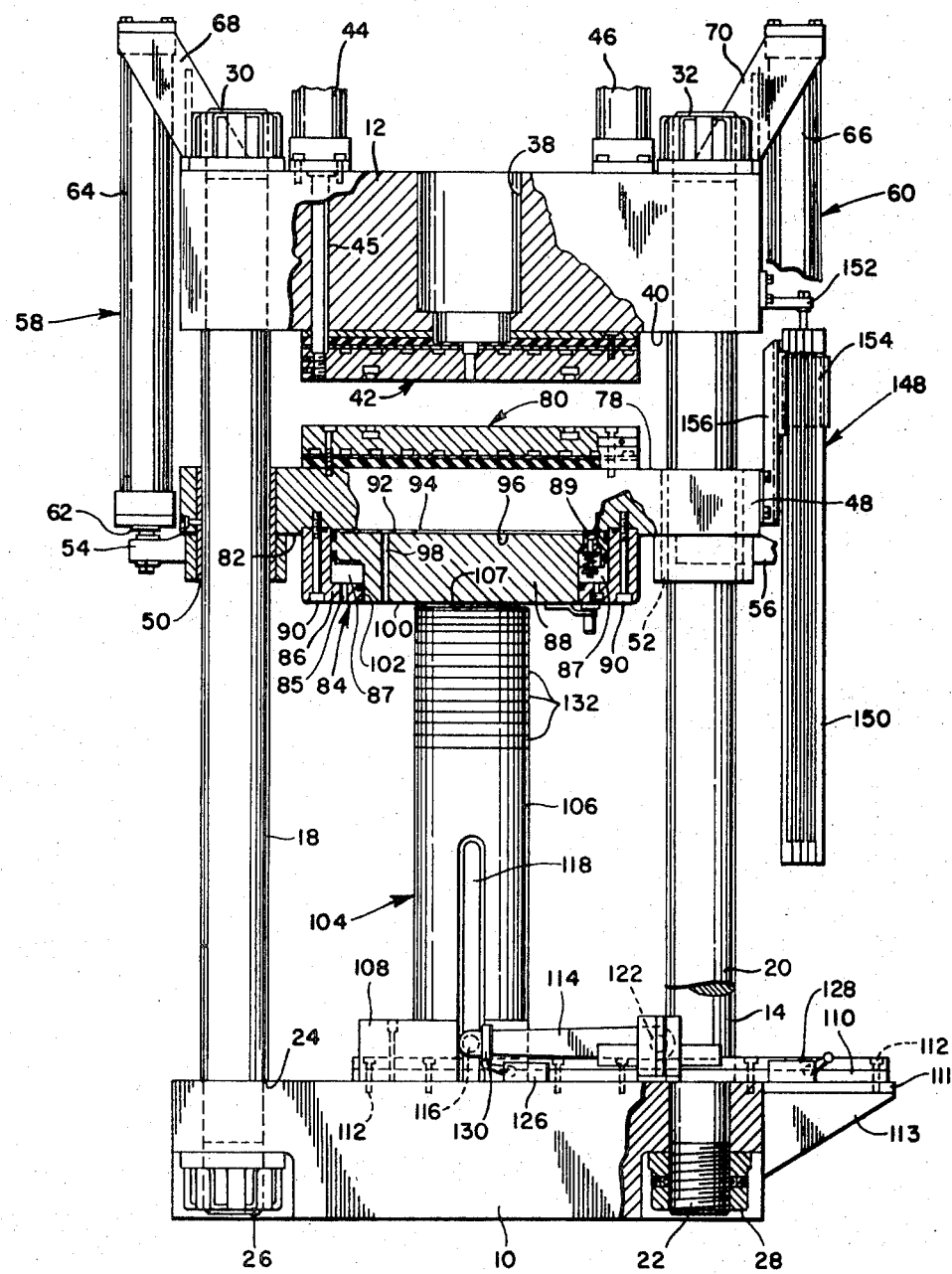
FIG. 1 is a fragmentary partial cross-sectional view of a part of an injection molding machine and showing a pair of fixed end plates supported by tie rods or strain rods and a movable intermediate plate carried thereby, together with a pedestal assembly for preventing retrograde movement of the movable plate, as for example during molding.

While the poppet valve assembly of this invention is useful with any hydraulic ram system, it will be illustrated in conjunction with a closure means for an injection molding machine or a die-casting machine. As a suitable environment, then, there is shown in FIG. 1 a portion of an injection molding machine for injecting a thermosetting material such as rubber. There is provided a first end plate or base 10 and a second end plate 12, the end plates 10 and 12 being held in spaced relation by cylindrical tie bars 14, 18 and 20. As shown in FIG. 1, the ends of the strain rods are conveniently threaded as, for example, with threads 22 on strain rod 14. The thread diameter is less than the diameter of the strain rod so there is provided a shoulder, such as shoulder 24, on strain rod 18. The end plates 10 and 12 may be tightly abutted against the shoulders such as shoulder 24, and held into position by strain rod nuts 26, 28, 30 and 32, for example. Each end plate is provided with such nuts, those holding end plate 10 in position desirably being recessed, as shown, to reduce the overall length of the structure.

The end plate 12 is conveniently provided with an aperture 38 adapted to receive a nozzle portion of an injection cylinder, one structure of which is shown in U.S. Pat. No. 3,194,868. On its inner face 40, there are provided mold-support means generally indicated at 42 adapted to hold a mold portion or section, e.g. one-half of a split mold. The mounting of this mold portion supporting structure is novel and obviates the use of cam-type clamps conventionally utilized for securing the upper mold support 42 in abutting relation with end plate 12. To this end, there are provided hydraulic cylinders 44 and 46, each partially shown, secured to the remote surface of the end plate 12 and having piston rods such as a piston rod 45 extending in an axial direction through the end plate 12 from the remote surface to and beyond the surface against which the mold portion 42 is normally in abutting relation. In vertical machines of considerable height, utilization of a cam-type clamp of conventional design imposes difficulties in terms of manual access. Utilization of the hydraulically actuated extensible arms 44 and 46 eliminates these clamping means, allows for movement of the upper mold-supporting plate structure 42 longitudinally of the machine for more convenient access, and makes possible control of both the clamping operation and the longitudinal disposition thereof from a control panel located within easy reach of an operator.

Mounted for movement along the strain rods, e.g. strain rods 14 and 18, is a movable plate 48 fitted with suitable bushings such as bushings 50 and 52. Laterally extending lugs 54 and 56 attached to plate 48 are also attached to double-acting hydraulic piston-cylinder assemblies 58 and 60, whereby movement of the intermediate plate 48 along the strain rods 14 and 18 is effected. In the embodiment shown in FIG. 1, the lugs 54 and 56 are attached to rod members such as member 62. The rod members are attached to a movable piston within cylinders 64 and 66, respectively, in a known manner. The piston-cylinder assemblies 58 and 60 are in turn secured at their upper extremities to brackets 68 and 70 which are in turn secured to suitable mounting plates 72 and 74 bolted by bolts 76 to the end plate 12. Operation of the piston-cylinder assemblies 58 and 60 in unison causes movement of the movable plate 48 along strain rods 14 and 18 in a conventional manner.

The upper face 78 of intermediate plate 48 is, in a manner similar to the end plate 12, fitted with mold-support means generally indicated at 80 of conventional design for supporting a mating mold portion or section, not shown.

A piston-cylinder mold-closing assembly of a type useful in conjunction with the present invention is generally indicated at 84 mounted on the opposite face 82 of movable plate 48 from the mold-support means 80. In the embodiment shown, a piston-cylinder assembly 84 includes a cylinder member 86 and a piston member 88 in which piston 88 is movable relative to the intermediate plate 48, and the cylinder portion 86 is secured to the face 78 of intermediate plate 48 as by bolts 90. The piston member 88 is also provided with a poppet valve assembly generally indicated at 89, shown in enlarged detail in FIGS. 2 and 3, which permits fluid communication between a high pressure variable volume chamber 92 and a low pressure variable volume chamber 87. The chamber 92 defined by the confronting faces 94 and 96 of movable plate 48 and movable piston 88, respectively, is adapted for receiving fluid under relatively high pressure as for example through port 98. Piston face 96 is referred to for convenience as a "high pressure face" and the chamber 92 as a "high pressure" chamber. When abutment means are provided for the externally exposed surface 100 of the piston 88 extending through an opening 102 in the end of cylinder 86, and the cavity or chamber 92 is filled with fluid, e.g. hydraulic oil, under pressure, retrograde movement of the movable head 48 is prevented and an extremely high closing force may be brought to bear upon the mating mold portions (not shown) clamped between the mold support means 42 and 80, respectively. The relatively large diameter of the piston body 88 and the short stroke, e.g. about 0.25 of an inch, relative to the diameters of the small diameter and longer strokes of high-speed cylinders 58 and 60, enables closing of the mold and the application of extremely high closing force without moving a great deal of liquid. Similar closure means are described in U.S. Pat. No. 2,718,662 in which a high pressure chamber such as chamber 92 is pressurized in a like manner during the molding operation.

After the molding operation, the line communicating with the port 98 (not shown) is vented to the oil reservoir to release the pressurized fluid from high pressure chamber 92, and fluid under pressure is admitted to chamber 87 through inlet port 85 to lift piston 88 so as to be free from the pedestal 104. Chamber 87 is referred to herein for convenience as a "low pressure chamber" and the working face 135 of piston 88 as a "low pressure face". The terms "high" and "low" are relative one to the other and refer to the conditions during molding, it being understood that there are times in a cycle when the fluid pressure in "low pressure" chamber 87 is higher than the fluid pressure in the "high pressure" chamber 92.

The abutment means comprises a pedestal generally indicated at 104. The pedestal assembly in the illustrated embodiment includes an upstanding cylindrical post 106 mounted on a base 108. The entire pedestal assembly 104 is laterally movable along guideway 110. In the position shown in FIG. 1, the pedestal is located for coaction with piston 88 to prevent retrograde movement of the movable plate 48 along strain rods 14, 18 and 20.

Guideway 110 is secured to end plate 10 by any suitable means such as by bolts 112. In order to move the pedestal assembly 104 out of retrograde movement-preventing position, there is provided a device for converting rotary movement to linear movement and including a fluid-actuated arm 114 having mounted at its distal extremity a roller 116 which is mounted on an axis for rotating normal to the longitudinal axis of arm 114. The roller 116 coacts with slot 118 milled into one side of the post 106. Fluid-operated motor means generally indicated at 120 coact in a suitable fashion with a shaft 122 which is dowelled or pinned (not shown) to the arm 114 at its proximal extremity. Rotation of the arm 114 clockwise through 180° will cause, therefore, a lateral displacement of the pedestal assembly 104 to the right-hand extremity of guideway 110.

In order to accommodate the outermost extension of the guideway 110, there is provided a platform 111 in coplanar relation with the upper surface of end plate 10. The platform 111 is supported by the bracket 113 (FIG. 1).

The uppermost portion of the post 106 is provided with extension means in the form of a plurality of discs 132, any desired number of which may be suitably mounted on the distal extremity of post 106 to adjust the operative length thereof to accommodate differences in thicknesses of the combined mold portions. Any suitable means for securing the discs 132 may be provided.

The poppet valve assembly indicated at 89 shown in enlarged detail in FIGS. 2 and 3 may be used singularly or in plural disposition in the piston 88. Located in a generally cylindrical valve bore 131 through the piston head 88 outside the peripheral boundary of the extension 100 of the piston 88 is a system of oppositely acting poppets 133 and 138 held against seats 136 and 140 provided in the valve bore 131 to close the valve bore during normal functioning of the double-acting hydraulic piston-cylinder assembly 84. The valve stem 132 has an enlarged poppet valve head 133 at the proximal end and a reduced diameter stem extending to its distal extremity which is threaded to receive an adjustable collar or nut 146 suitably locked thereto, as by a set screw. Interposed between the enlarged poppet valve head 133 and the nut 146, and concentrically slidably fitted about the valve stem 132, are the secondary poppet 138 fitted with a skirt portion 139 and the biasing spring 145 as shown in FIG. 2. Sealing means 144 may be disposed in the portion of the secondary poppet 138 that is closely fitted to the stem 132. The force of spring 145 tends to drive the opposed poppet valve faces 134 and 140 of the poppet valve 133 and the secondary poppet 138, respectively, against the opposed valve seat faces 136 and 142 provided in the passage 131. The nut 146 of the poppet valve stem 132 extends beyond the lower working face 135 of the piston 88 which forms the upper boundary of the low pressure chamber 87 a distance adjustable to the desired displacement of the poppet valve 133 to mechanically lift its face 134 from the seat 136 in the valve open position. The longitudinal distance between the lower end of the secondary poppet 138 and the adjacent face of the nut 146 is set manually to approximately twice the distance the valve stem 132 and the nut 146 extend beyond the face 135 of the piston 88 as shown in FIG. 2.

The venting position of the poppet valve assembly is best illustrated in FIG. 3 where piston 88 of the piston-cylinder assembly 84 has moved to its fully extended position within the cylinder 86, its lower working face 135 abutting the internal apertured end face 137 of the cylinder 86. With the piston 88 in this extended position the distal end of the valve stem 132 is also abutting the internal end face 137 of the cylinder 86. The abutment causes the poppet valve 133 to be lifted from its seat 136 in the piston 88, thereby opening the hydraulic fluid chamber 92 into direct communication with valve bore 131. This exposes the poppet valve surface 140 of the secondary poppet 138 to the hydraulic pressure existing in chamber 92. If the force of the hydraulic fluid pressure in chamber 92 impressed upon the exposed portion of surface 140 of the secondary poppet 138 should exceed the force or bias of the spring 145, the secondary poppet 138 will slide along the valve stem 132 toward abutment with the adjacent surface of the nut 146 to provide direct communication between the valve bore 131 and hydraulic fluid chamber 87. This effectively vents high pressure fluid in chamber 92 through valve bore 131 and chamber 87 to port 85 which is vented automatically by a four-way directional control valve (not shown), typically and conventionally used with double-acting hydraulic cylinders. Instead of a low pressure chamber 87, there may be provided merely a vent or conduit to a reservoir. The second poppet permits pressurizing of chamber 87 to return the piston 88 to the zero stroke position without by-passing hydraulic fluid through the valve bore 131 into the high pressure chamber 92.

OPERATION OF THE MACHINE

The operation of the embodiment of the injection molding machine partially shown in FIG. 1 is essentially the mode of operation as described in the aforesaid U.S. Pat. No. 2,718,662 with useful improvements and refinements.

Briefly, injection means such as those shown in the aforesaid prior art patents are mounted in the bore 38 provided in the fixed end plate 12. Any conventional injection means for moldable material including heating elements may be used. A suitable cavity-type mold is secured to the mold-support structures 42 and 80, the emplacement of the mating mold portions being accomplished with the pedestal assembly 104 in its fully retracted position to the right of the guideway 110 as shown in FIG. 1. Extensible arms 58 and 60 are used to move movable plate 48 in a direction toward the fixed end plate 10 to facilitate the placement of the mold portions, not shown. When the mold is ready for injection, hydraulically actuated extensible arms 58 and 60 are used to move the movable plate 48 to the position shown in FIG. 1 at which point the mold is closed under the influence of the relatively small diameter pistons in extensible arms 58 and 60. The pedestal assembly 104 is then moved by means of the arm 114 rotating in a counterclockwise direction as shown in FIG. 1 from the right-hand extremity of the guideway 110 to the position shown in FIG. 1. Just prior to injection, fluid under pressure is introduced through port 98 into the chamber 92 between the piston 88 and the lower face of movable plate 48, causing the piston 88 to move downwardly and come into abutting relation with the post 106. Because of the large surface area of piston 88, extremely high closing force can be brought to bear upon the mold whereby retrograde movement of the plate 48 in response to the injection pressure is prevented. Programming means generally indicated at 148 and including a slide bar 150 supported by a suitable bracket means 152 secured to the end plate 12 cooperate with a slider 154 mounted on a bracket 156 which is in turn secured to the movable plate 48. The various sequences of operation are controlled by suitably disposed and positioned switches carried by these programming means, all in a well known and conventional manner. After injection and curing, all in a known manner, the hydraulic fluid under pressure in chamber 92 is vented through port 98, and fluid under pressure is introduced through port 85 into chamber 87 on the end of piston 88 opposite chamber 92 to cause the piston 88 to move toward the lower surface 94 of the movable plate 48 and away from abutting relation with the post 106. The pedestal assembly 104 is retracted to its laterally removed position by clockwise rotation of arm 114, the mold opened by action of arms 58 and 60, and the casting removed from the mold.

If it should occur that the pedestal assembly 104 is in the retracted position so as to be unable to prevent retrograde movement of the piston-cylinder assembly 84 and pressurized fluid inadvertently admitted to the chamber 92, then the safety valve assembly 89 will function in the manner stated above to prevent damage to the structure. Also, if mold sections are not in place on the mold-supporting plates 42 and 80, the device will also function to prevent damage to the structure.

What is claimed is:

1. In a double-acting hydraulic cylinder and piston assembly including a cylinder body having a high pressure end and an apertured end, a piston body reciprocable in said cylinder body between said ends in response to the movement of pressurized hydraulic fluid and having a high pressure face in confronting relation to said high pressure end and defining a high pressure variable volume fluid receiving chamber therebetween, said piston having a low pressure face in confronting relation to said apertured end and defining a relatively low pressure variable volume fluid receiving chamber therebetween, said piston having a piston extension extending through said apertured end; and fluid inlet and outlet means for each of said chambers, the improvement which comprises a compound poppet valve assembly including:
   a. a valve bore extending through said piston and having a pair of opposed axially spaced valve seats therein, said bore communicating with said high pressure chamber and said low pressure chamber;
   b. a valve stem concentrically disposed in said bore;
   c. a first poppet valve member at the proximal extremity of said valve stem adapted for seating coaction with one of said valve seats;
   d. means coacting between the distal extremity of the valve stem and one end of said cylinder body for mechanically unseating said poppet valve member in response to movement of said piston beyond a predetermined point;
   e. an oppositely acting second poppet valve concentrically and axially slidably mounted on said valve stem for coaction with the other of said valve seats; and
   f. resilient means coacting between said valve stem and said oppositely acting second poppet valve to bias the latter toward said first poppet valve member and in opposition to pressurized fluid when said poppet valve member is mechanically unseated.

2. A hydraulic cylinder and piston assembly in accordance with claim 1 in which the mechanical unseating means includes a collar secured to the distal extremity of said valve stem.

3. A hydraulic cylinder and piston assembly in accordance with claim 2 in which the collar is threadedly secured to said valve stem.

4. A hydraulic cylinder and piston assembly in accordance with claim 2 in which the unseating means includes an abutment surface on the apertured end.

5. A hydraulic cylinder and piston assembly in accordance with claim 1 in which the resilient means is a coil spring.

6. A hydraulic cylinder and piston assembly in accordance with claim 5 in which the coil spring is biased between a collar secured to the distal extremity of said valve stem and said second poppet valve.

7. A hydraulic cylinder and piston assembly in accordance with claim 6 in which said second poppet valve includes a skirt portion surrounding said coil spring and of an axial length for abutting relation with said collar when said second poppet valve is fully open.

* * * * *